United States Patent [19]
Carlsen et al.

[11] Patent Number: 5,445,663
[45] Date of Patent: Aug. 29, 1995

[54] FERTILIZER COMPOSITION COMPRISING DISPERSIONS OR SOLUTIONS OF NUTRIENT COMPOUNDS AND METHOD FOR ITS MANUFACTURE

[75] Inventors: Arne Carlsen, Skien; Erik C. Nygaard, Porsgrunn; Erik Syrstad, Nesbru, all of Norway; Tom Consoli, Lafayette, Calif.

[73] Assignee: Norsk Hydro a.s., Oslo, Norway

[21] Appl. No.: 95,993

[22] Filed: Jul. 23, 1993

Related U.S. Application Data

[63] Continuation of Ser. No. 855,790, Mar. 23, 1992, abandoned.

[30] Foreign Application Priority Data

Feb. 28, 1992 [NO] Norway ................. 920788

[51] Int. Cl.$^6$ .................. C05C 1/00; C05C 4/00; C05C 11/00
[52] U.S. Cl. ................................... 71/28; 71/29; 71/30; 71/64.04; 71/64.08; 71/64.1
[58] Field of Search ............ 71/64.08, 1, 64.10, 71/64.4, 28, 30

[56] References Cited

U.S. PATENT DOCUMENTS

| | | | |
|---|---|---|---|
| 3,661,550 | 5/1972 | Downer et al. | 71/1 |
| 3,982,920 | 9/1976 | Cross et al. | 71/1 |
| 4,443,242 | 4/1984 | Fox | 71/64.08 |
| 4,578,105 | 3/1986 | Moore | 71/64.08 |
| 4,997,642 | 3/1991 | Curtis et al. | 71/64.08 |

FOREIGN PATENT DOCUMENTS

WO93/01150 1/1993 WIPO.

OTHER PUBLICATIONS

Phillips, Jr. et al., U.S. Defensive Publication T969,003, Apr. 4, 1978.

Primary Examiner—Ferris Lander
Attorney, Agent, or Firm—Wenderoth, Lind & Ponack

[57] ABSTRACT

The present invention relates to a fertilizer composition comprising solution or dispersion of nutrient compounds and method for its manufacture. The solution/dispersion constitutes the discontinuous phase of a water-in-oil type (w-i-o) emulsion having a volume phase ratio, discontinuous phase: total volume in the range of 0.80–0.95. The fertilizer composition may additionally contain 0–60 weight % solid nutrient salts and/or urea. The oil or hydrocarbon component of the w-i-o emulsion comprises mineral, vegetable or animal oils, wax or mixture of these, and the emulsion comprises at least one w-i-o emulsifier. The hydrocarbon component may also contain 0.5–6 weight % of elastomer, preferably polyisobutylene. The method comprises dissolving or dispersing the nutrient compounds at a temperature of 5°–15° C. above the crystallization temperature of the mixture, and then adding while stirring to a mixture of emulsifier and hydrocarbon, said latter mixture having been heated to about the same temperature as the former mixture. The combined mixtures are exposed to intensified stirring for 0.3–3 minutes.

11 Claims, 2 Drawing Sheets

FERTILIZER COMPOSITION COMPRISING DISPERSIONS OR SOLUTIONS OF NUTRIENT COMPOUNDS AND METHOD FOR ITS MANUFACTURE

This application is a continuation of now abandoned application, Ser. No. 07/855,790, filed Mar. 23, 1992.

BACKGROUND OF THE INVENTION

The present invention relates to fertilizer compositions comprising dispersions or solutions of nutrient compounds, the most interesting type of such compositions being slow release fertilizers.

The invention further relates to manufacture of such fertilizers.

DESCRIPTION OF THE PRIOR ART

One problem related to application of mineral fertilizers is the risk of losing nutrient salts into the ground water, rivers and lakes. Application of too much fertilizer or heavy rain during or just after application of the fertilizer will increase the risk of such pollution of the water reservoir. One way of protecting granulated or prilled fertilizer against too rapid release into the ground and also the water reservoirs is to coat the fertilizer particles by special chemicals such that the nutrient is released over a certain period of time. However, most of the coatings used today are not very suitable for this purpose and the effect attained is only of limited value.

In several countries application of aqueous solutions of nutrients is an extensively used form of mineral fertilizer. Several of these systems are to a greater extent than prilled or granulated fertilizer subject to loss of nutrients due to uncontrolled release into the water reservoirs. It is known in the art that such undesired release may be reduced by addition of various types of gel-forming compounds like guar gum derivatives.

In an aqueous environment these will form hydrates and form molecular networks in the aqueous solution and thereby reduce the release of nutrients to some extent. However, tests performed have shown that the application of gelling agents will only to a small degree be able to reduce the release of nutrients from aqueous solutions of mineral fertilizers.

In U.S. Pat. No. 4,880,455 there is described a slow release fertilizer coated with a water-insoluble polymer of prepolymerized crosslinked unsaturated oil. The fertilizer particles are preferably coated with two layers of coatings. Thus coated fertilizer particles are stated to be strong and release the fertilizer over prolonged periods of time. However, such coatings are expensive, especially when applied in two layers. A further disadvantage related to such coatings is that if only a tiny hole is formed in the coating the nutrient will rapidly leach out and the effect of the coating is virtually nonexistent with regard to slow release. To prevent the well known risk of penetration of the coating, several layers of coatings are applied, but this increases the overall cost of the fertilizer.

Aqueous fertilizer slurries which can be pumped and sprayed are known from the patent description RD-263035 A (IB Chemical CO). Isobutylidene Diurea (IBDU) alone or together with urea is dispersed in water to form a slow release fertilizer. To this solution there are added dispersing agents and gelling agents such as alginates, guar gum derivates, etc. This fertilizer is restricted to containing IBDU which in itself releases the nutrient compounds rather slowly.

SUMMARY OF THE INVENTION

The main object of the present invention was to arrive at a new type of liquid fertilizer composition having a high nutrient value and being pumpable such that they could be spread out on the fields by means of conventional spreader equipment.

A second object was to attain a fertilizer having desired slow release properties without the disadvantages related to known slow release fertilizers.

A further object was to attain such fertilizer compositions that were not restricted to special nutrient salts only.

One disadvantage of known aqueous fertilizer compositions is their low content of nutrient as it is necessary to have a relatively high content of water to avoid precipitation of the nutrient salts and thereby make the solution unstable, especially during storage at low temperature.

The inventors tried to attack this problem by using surfactants and adding components which are not soluble in water. It was then surprisingly found that highly concentrated aqueous solutions/dispersions of nutrient compounds could be obtained by letting this solution/dispersion constitute the discontinuous phase of a water-in-oil emulsion. Further investigations proved that the amount of the oil component could be extremely low without reducing the stability of the w-i-o emulsion. It was also found that even highly concentrated fertilizer melts with virtually no water could be emulsified into a w-i-o type emulsion. This is probably due to the fact that such melts are not soluble in the oil or hydrocarbon used for the continuous phase.

Thus, the present invention provides a fertilizer composition comprising a solution or dispersion of nutrient compounds, characterized in that the solution/dispersion constitutes the discontinuous phase of a water-in-oil type (w-i-o) emulsion and that the volume phase ratio, discontinuous phase: total volume is in the range of 0.80–0.95, and that the fertilizer composition additionally may contain 0–60 weight % solid nutrient salts and/or urea, that the oil or hydrocarbon component of the w-i-o emulsion comprises mineral, vegetable or animal oils, wax or mixture of these, and that the emulsion comprises at least one w-i-o emulsifier.

DETAILED DESCRIPTION OF THE INVENTION

Figure 1:
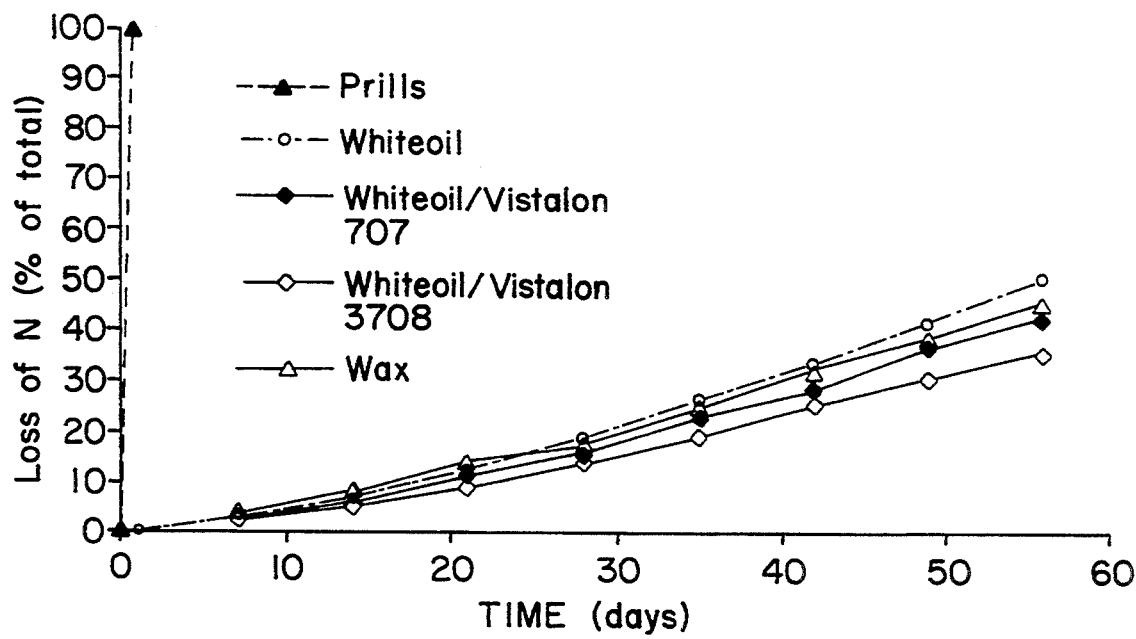
FIGS. 1–4 show the results obtained in Examples 1–4, respectively, set forth hereinafter.

Incorporation of oil in fertilizers is generally considered negative from agronomic and environmental points of view. Incorporation of aqueous salt solutions into w-i-o emulsions is generally known in the art, especially in the explosives field. But such emulsions might contain as much as 20 weight % hydrocarbons and such large amounts of oil would be prohibitive in fertilizers for several reasons as indicated above.

In view of the fact that hydrocarbons used in w-i-o emulsions are not soluble in water, the emulsion as such should not be very soluble in water. The problem was then to obtain a stable emulsion having a minimum of oil and maximum of nutrients. Thus the emulsion should have a high phase ratio (i.e. volume of discontinuous phase/total volume) and further have a liquid phase having a high content of nutrient compounds. Experiments have shown that the phase ratio should be larger than 0.8 and might be as high as 0.95. The most preferred phase ratio was found to be 0.90–0.94. It was found that such w-i-o emulsions could be obtained and possess high stability even when the aqueous phase was strongly supersaturated. No crystallization or precipitation of nutrient compounds was registered for the new fertilizer compositions according to the invention.

The hydrocarbon phase comprises oils, waxes or mixture of these. The hydrocarbons are of mineral, vegetable or animal origin and their properties may further be modified by addition of polymers or elastomers such as polyethylene wax, polyisobutylene, etc. These additives are used to modify the viscosity of the emulsion and this proved to retard the release of nutrients of the emulsion. Useful amounts of such elastomers were found to be 0.5–6 weight % of the hydrocarbon phase. The hydrocarbon phase is not required to be liquid at production temperature of the emulsion, it should, however, be liquified prior to the emulsification step.

Applicable emulsifiers are selected from those generally used for w-i-o emulsions and must be agronomically and environmentally acceptable. A typically useful type of emulsifier is sorbitane monooleate. If non-ionic emulsifiers are used, the HLB value of the emulsifier or mixtures thereof should be less than 7 (HLB: hydrophile-lipophile balance).

The solution/dispersion, i.e. the discontinuous phase of the fertilizer emulsion, may comprise a solution of one nutrient compound only or a mixture of nutrient compounds. The solution can be supersaturated and may even contain minor amounts of salts which are not soluble in water. However, too large amounts of such salts may effect negatively the storage stability of the emulsion. During the development of the invention several different aqueous nutrient solutions and melts have been emulsified and some typical examples are mentioned:

Urea
Ammonium nitrate
Calcium nitrate
Sodium nitrate
Complex fertilizer (NPK)
Mono- or diammonium phosphate (MAP or DAP)
Potassium nitrate Such solutions have been emulsified as pure systems, but also mixtures of the above mentioned types have been emulsified. Micronutrients like manganese, iron, zinc, etc. have also been successfully incorporated in the fertilizer emulsions.

It has further been found that to such fertilizer emulsions varying amounts of solid mineral fertilizers can be added. About 20 weight % of prilled complex fertilizer (NPK) was for instance added to one of the new fertilizer emulsions without reducing substantially the mixture's ability to release nutrient over a given period of time. Higher amounts of solid fertilizer may also be added to the emulsion fertilizer, but this might reduce the time for release of nutrients. This slightly negative effect of additional solids should be evaluated in view of the total cost of the fertilizer composition. Thus it has been found that up to 60 weight % of the total fertilizer composition comprising an emulsion may consist of solid fertilizers.

Typical fertilizer compositions according to the invention comprise:

Fertilizer compositions in which the aqueous discontinuous phase is a supersaturated solution of ammonium nitrate and where the phase ratio of the emulsion is 0.8–0.95.

Another preferred type of fertilizer composition according to the invention are those in which the discontinuous phase contains 0–25 weight % water and 100–75 weight % urea, ammonium nitrate or urea-ammonium nitrate (UAN).

Fertilizer compositions according to the invention comprising solid nutrients would preferably consist of 90–70 weight % w-i-o type emulsion and 10–30 weight % solid nutrients.

The scope of the invention is as defined in the attached claims.

The invention will now be further described and illustrated in the following examples.

In the following description there are shown various examples of manufacture and testing of fertilizer compositions according to the invention.

Method of Manufacture

All the compositions were made by applying nutrient compounds dissolved in water at a temperature of 5°–15° C., for example, about 10° C., above the crystallization temperature of the mixture. Then the aqueous solution was added to a solution of hydrocarbons and emulsifier which was heated to the same temperature, during intensive stirring by means of a turbine stirrer. Stirring speed, time of stirring and dimensions of the stirrer will depend on the size of the mixture. In the examples there was used a mixture of about 600 g. A turbine stirrer was used having a diameter of 8 cm. At start-up there was applied a speed of 600 revolutions per minute (rpm). The aqueous solution was added over a period of about 1 minute. Then the stirring speed was increased to 1200 rpm and the stirring continued for about 2 minutes.

For an industrial application a continuous emulsification process would be preferred. However, for laboratory tests batch processes are preferred to secure easy control of the various process parameters like stirring intensity, etc. for obtaining desired mixing. Typical range for stirring time will be 0.3–3 minutes.

Sorbitane monooleate (Span-80 from ICI) was used as emulsifier in all the examples in an amount of about 1 weight % of the total weight of the mixture.

The results are stated as amount nitrogen lost compared to the original N-content. This is chosen because the N-content of the original examples varies.

EXAMPLE 1

This example shows the effect of modifying the hydrocarbon phase by addition of various types of elastomers, in all the experiments the same nutrient solution (ammonium nitrate and urea) was used. The phase ratio was: about 0.91.

Vistalon 707 and 3708 are trade names for commercial polyisobutylene, in the following table stated as Elastomer 1 and 2, respectively.

| Mixture No. | | 1.1 | 1.2 | 1.3 | 1.4 | 1.5 |
|---|---|---|---|---|---|---|
| Mixture type | | Prills | Emulsion w/white oil | Emulsion w/white oil Vistalon 707 | Emulsion w/white oil/ Vistalon 3708 | Emulsion w/wax |
| Water content | (%) | 5.0 | 5.0 | 5.0 | 5.0 | 5.0 |
| Ammonium nitrate | (%) | 50.0 | 45.0 | 45.0 | 45.0 | 45.0 |
| Urea | (%) | 50.0 | 45.0 | 45.0 | 45.0 | 45.0 |
| Emulsifier, Span-80 | (%) | 0 | 1.0 | 1.0 | 1.0 | 1.0 |
| White Oil | (%) | 0.0 | 4.0 | 3.9 | 3.7 | 0.0 |
| Elastomer 1 | (%) | 0.0 | 0.0 | 0.1 | 0.3 | 0.0 |
| Elastomer 2 | (%) | 0.0 | 0.0 | 0.0 | 0.0 | 4.0 |
| Results | | | | | | |
| Amount N lost after 56 days | (%) | 100 after 1 day | 50 | 42 | 35 | 45 |

The results are shown in FIG. 1. It can be seen that application of emulsions gives a dramatic reduction of release of nitrogen from the mixture. It is further seen that the rate of release can be altered by modifying the composition of the hydrocarbon phase. Addition of elastomer to the oil phase reduced the release of nitrogen from the emulsion compared to the release from emulsions which contain oil only. The same result can be obtained by applying wax, but this is usually a more costly hydrocarbon.

EXAMPLE 2

In this example the effect of altering the composition of the salt solution is shown. The phase ratio during these experiments was: about 0.91.

| Mixture No. | | 2.1 | 2.2 | 2.3 | 2.4 | 2.5 |
|---|---|---|---|---|---|---|
| Type | | Urea/AN Prills | Urea/AN Emulsion | CAN Emulsion | NPK Prills | NPK Emulsion |
| N-content | (%) | 40.7 | 36.7 | 23.4 | 20.0 | 15.0 |
| Urea | (%) | 50.0 | 45.0 | 0.0 | 0.0 | 0.0 |
| Ammonium nitrate | (%) | 50.0 | 45.0 | 45.0 | 0.0 | 0.0 |
| Calcium nitrate | (%) | 0.0 | 0.0 | 45.0 | 0.0 | 0.0 |
| NPK 20-6-12 | (%) | 0.0 | 0.0 | 0.0 | 100.0 | 75.0 |
| Water | (%) | 0.0 | 5.0 | 5.0 | 0.0 | 20.0 |
| White oil | (%) | 0.0 | 4.0 | 4.0 | 0.0 | 4.0 |
| Span-80 | (%) | 0.0 | 1.0 | 1.0 | 0.0 | 1.0 |
| Result: | | | | | | |
| Amount N lost (% of orig.) after 56 days | (%) | 100 after 1 day | 50 | 46 | 100 after 2 days | 55 |

Figure 2:
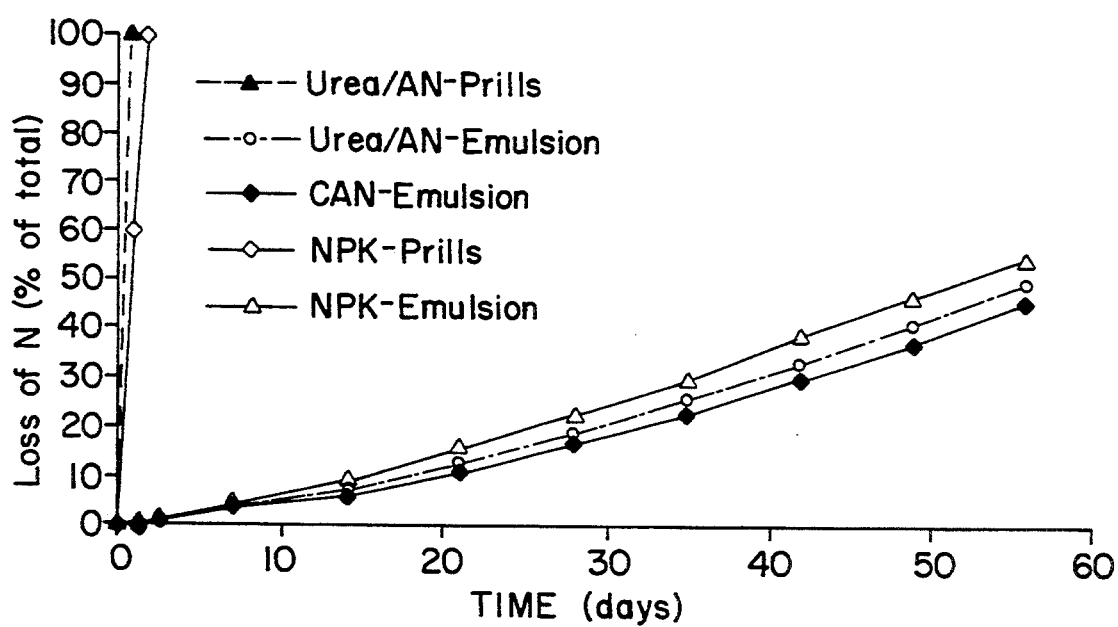

The complete results of this example are shown in FIG. 2. As can be seen from this figure, all the emulsions were tested for 56 days and they had lost about 50% of the original nitrogen content. The NPK emulsion gives the highest loss and the reason for this is probably that this one, due to the high content of micronutrients, is the least stable emulsion. However, it can be seen that even this emulsion gives a dramatic reduction of the nitrogen loss compared to prilled products.

EXAMPLE 3

In this example is shown the effect of altering the nitrogen concentration of the salt solution. The emulsions are made and tested according to the previous description. The phase ratio was: about 0.91.

| Mixture No. | | 3.1 | 3.2 | 3.3 | 3.4 | 3.5 |
|---|---|---|---|---|---|---|
| Type | | Prills | Emulsion | Emulsion | Emulsion | Emulsion |
| N-content | (%) | 40.7 | 38.7 | 36.4 | 34.0 | 32.7 |
| Urea | (%) | 50.0 | 47.5 | 45.0 | 42.5 | 40.0 |
| Ammonium nitrate | (%) | 50.0 | 47.5 | 45.0 | 42.5 | 40.0 |
| Water | (%) | 0.0 | 0.0 | 5.0 | 10.0 | 15.0 |
| White oil | (%) | 0.0 | 4.0 | 4.0 | 4.0 | 4.0 |
| Span-80 | (%) | 0.0 | 1.0 | 1.0 | 1.0 | 1.0 |
| Remarks: | | Mixture of AN and urea prills | | | | |
| Result: | | | | | | |
| Amount N lost (% of orig.) after 56 days | (%) | 100 after 1 day | 50 | 49 | 51 | 52 |

Figure 3:
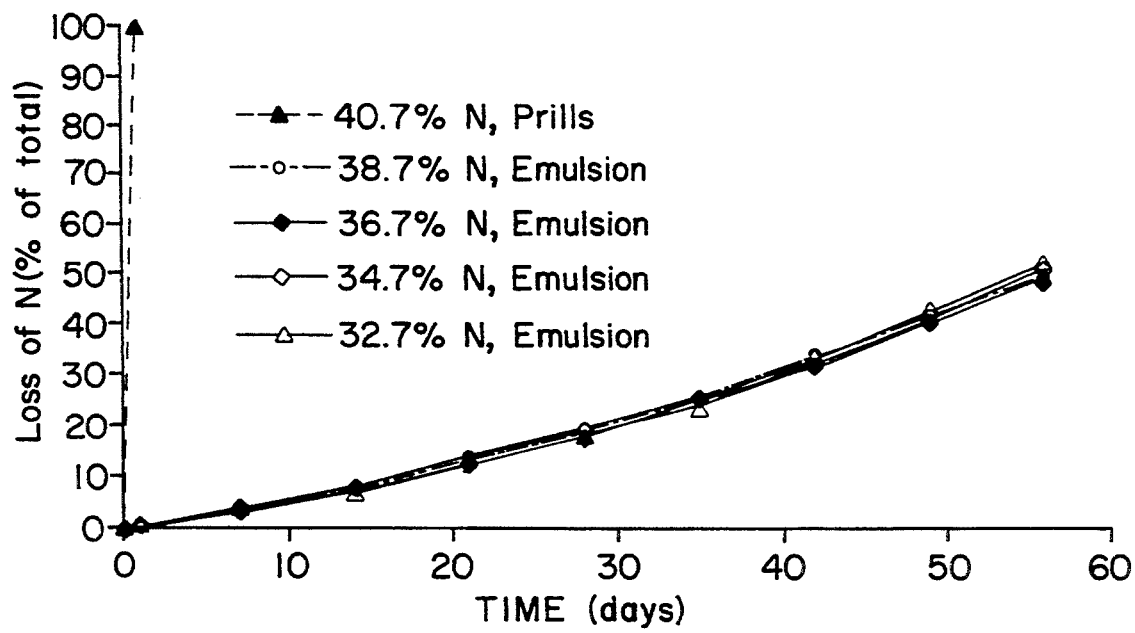

The results are shown in FIG. 3.

As can be seen the loss of nitrogen in percent is about the same and independent of the nitrogen concentration of the salt solution. Probably this is due to the fact that the release of nitrogen is caused by exposure of the salt droplets corresponding with the rate of degradation of the oil film by soil bacteria. Thus there is only minimal diffusion of nitrogen through the oil film.

Accordingly, it is possible to control the amount (in kg) of nitrogen released per unit of time by adjusting the original salt concentration.

EXAMPLE 4

In this example the samples (100 g of each) from Example 2 were placed in bottles containing 2 l of soil. The bottles were closed by wire cloth. The original bottoms of the bottles were removed and 1.5 l soil were filled in the bottles. Then 100 g of the sample were added before the remaining 0.5 l of soil was added. 200 ml of purified water were each week added to the samples. This water ran through the sample and was collected in beakers and thereupon analyzed in the conventional way. Further, tests were carried out in a soil sample without added fertilizer (reference). The values of loss of nitrogen from the samples were corrected against the value for release of nitrogen from the reference sample (pure soil).

| Mixture No | | 4.0 | 4.1 | 4.2 | 4.3 | 4.4 | 4.5 |
|---|---|---|---|---|---|---|---|
| Type | | Soil test | Urea/AN Prills | Urea/AN Emul. | CAN Emul. | NPK Prills | NPK Emul. |
| Comp., fertilizer | | | | | | | |
| N-content | (%) | 0.0 | 40.7 | 36.7 | — | — | |
| Urea | (%) | 0.0 | 50.0 | 45.0 | — | — | |
| Ammonium nitrate | (%) | 0.0 | 50.0 | 45.0 | 45.0 | | |
| Calcium nitrate | (%) | 0.0 | 0.0 | 0.0 | 45.0 | | |
| Water | (%) | 0.0 | 0.0 | 5.0 | 5.0 | 0.0 | 20.0 |
| White oil | (%) | 0.0 | 0.0 | 4.0 | 4.0 | 0.0 | 4.0 |
| Span-80 | (%) | 0.0 | 0.0 | 1.0 | 1.0 | 0.0 | 1.0 |
| Result: | | | | | | | |
| Amount N (of added fertilizer) after 56 days (corrected against N-loss from the soil test) | (%) | 1.2 g as N from soil test | 100 after 1 day | 34 | 37 | 100 after 2 days | 45 |

Figure 4:
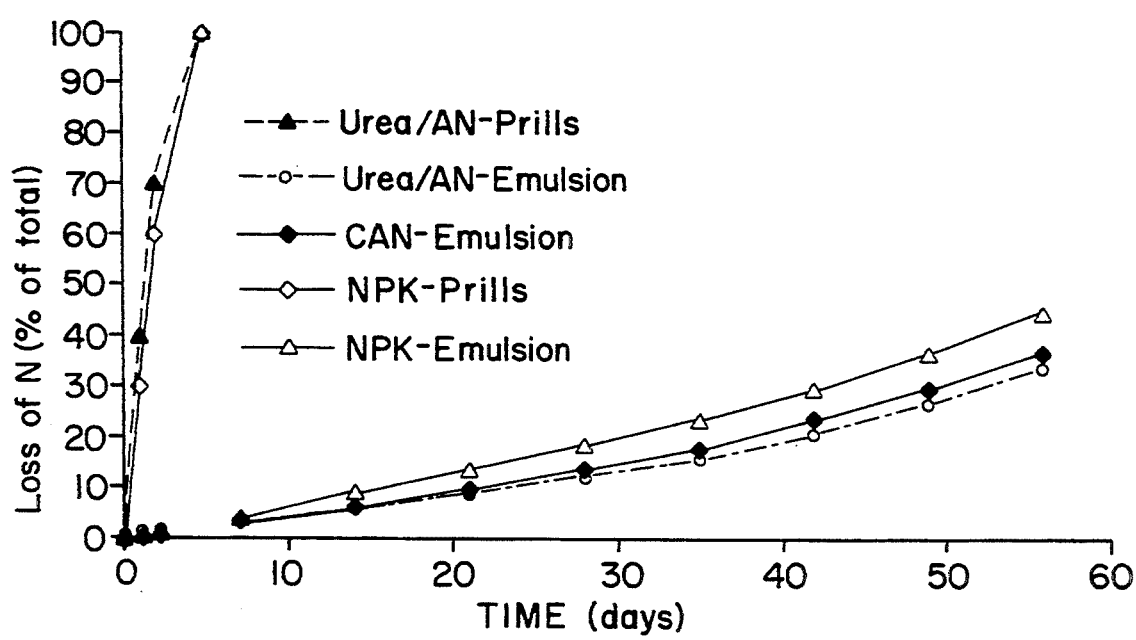

In FIG. 4 it is shown that the release of nitrogen is the same as shown in Example 2 (FIG. 2). All the samples according to the invention show dramatic reduction in release of nitrogen compared to traditional types of fertilizer. However, it can also be seen that the release of nitrogen takes place in a somewhat different way as the total loss is slower, but the curves show an increase as function of time. The reason for this is possibly that after some time bacteria are formed which consume oil and thereby break down the emulsion faster than can be seen from the samples tested in water. This is confirmed by one test where the mixtures Nos. 2.2 and 4.2 were investigated over a longer period than 64 days. It was then found that 100% of the nitrogen was washed out after 106 days from the mixture which was tested in Water (like 2.2), while 100% nitrogen was washed out after 89 days from the mixture which was tested in soil (4.2).

As can be seen from the examples and the figures, the inventors have succeeded in manufacturing new fertilizer compositions which are liquid and pumpable and can be applied on the fields by spreader equipment or injected into the soil, in spite of the fact that the new fertilizer compositions contain far less water than conventional liquid fertilizer. Said new w-i-o type emulsion may even be made directly from fertilizer melts and will accordingly hardly contain any water.

A number of fertilizer formulations can be made within this new emulsion concept. Thus even solid fertilizer can be mixed with the emulsion fertilizer and still have pumpable properties.

The new fertilizer compositions possess excellent slow release properties and contain far less hydrocarbons than conventional coated solid fertilizers of the slow release type.

We claim:

1. A slow release fertilizer composition comprising a solution or dispersion of nutrient compounds selected from the group consisting of urea, complex fertilizer (NPK), nitrates, phosphates, and mixtures thereof, characterized in that the solution/dispersion constitutes the discontinuous phase of a stable emulsion and that the volume phase ratio, discontinuous phase: total volume is in the range of 0.80–0.95, and that the fertilizer composition additionally may contain 0–60 weight % solid nutrient selected from the group consisting of urea, complex fertilizer (NPK), nitrates, phosphates, and mixtures thereof, that the continuous phase is an oil or hydrocarbon component which consists essentially of mineral, vegetable or animal oils, wax or mixture of these, and that the emulsion comprises at least one agronomically and environmentally acceptable w-i-o emulsifier.

2. A fertilizer composition according to claim 1, characterized in that the hydrocarbon component contains 0.5–6 weight % of elastomer.

3. A fertilizer composition according to claim 2, wherein the elastomer is polyisobutylene.

4. A fertilizer composition according to claim 1, characterized in that the discontinuous phase is a supersaturated solution of ammonium nitrate and that the phase ratio of the emulsion is 0.90–0.94.

5. A fertilizer composition according to claim 1, characterized in that the discontinuous phase contains 0–25 weight % water and 100–75 weight % urea, ammonium nitrate or urea-ammonium nitrate (UAN).

6. A fertilizer composition according to claim 1, characterized in that the discontinuous phase comprises complex fertilizer (NPK).

7. A fertilizer composition according to claim 6, wherein the composition further comprises micronutrients.

8. A fertilizer composition according to claim 1, characterized in that the hydrocarbon of the continuous phase is white oil and the emulsifier is sorbitane monooleate.

9. A fertilizer composition according to claim 1, characterized in that the hydrocarbon of the continuous phase comprises wax and 0.5–6 weight % elastomer.

10. A fertilizer composition according to claim 1, characterized in that the fertilizer composition consists of 90–70 weight % emulsion and 10–30 weight % solid nutrients.

11. A method of manufacture of a fertilizer composition according to any one of claims 1–8, which comprises dissolving or dispersing nutrient compounds at a temperature of 5°–15° C. above the crystallization temperature of the mixture to constitute the discontinuous phase, and then adding while stirring to a mixture of emulsifier and hydrocarbon which may contain 0.5–6 weight % elastomer, said mixture having been heated to about the same temperature as the former mixture, and wherein the combined mixtures are exposed to intensified stirring for 0.3–3 minutes.

* * * * *